Jan. 25, 1955 G. B. CARLSON ET AL 2,700,479
AUTOMATIC MECHANISM FOR CONVEYING, WEIGHING AND DISCHARGING
MATERIAL TO A PLURALITY OF SEPARATE LOCATIONS
Filed July 9, 1951 3 Sheets-Sheet 1
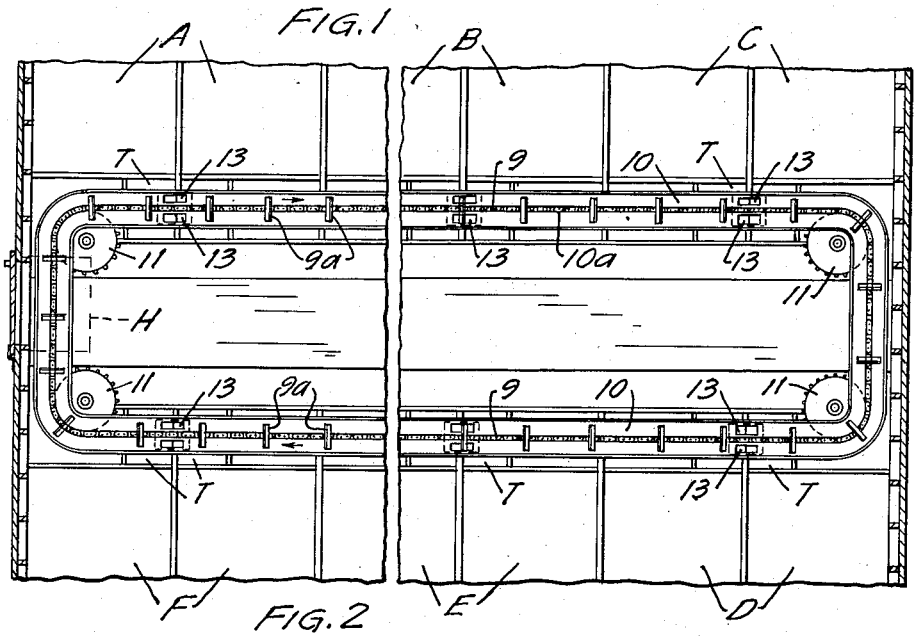
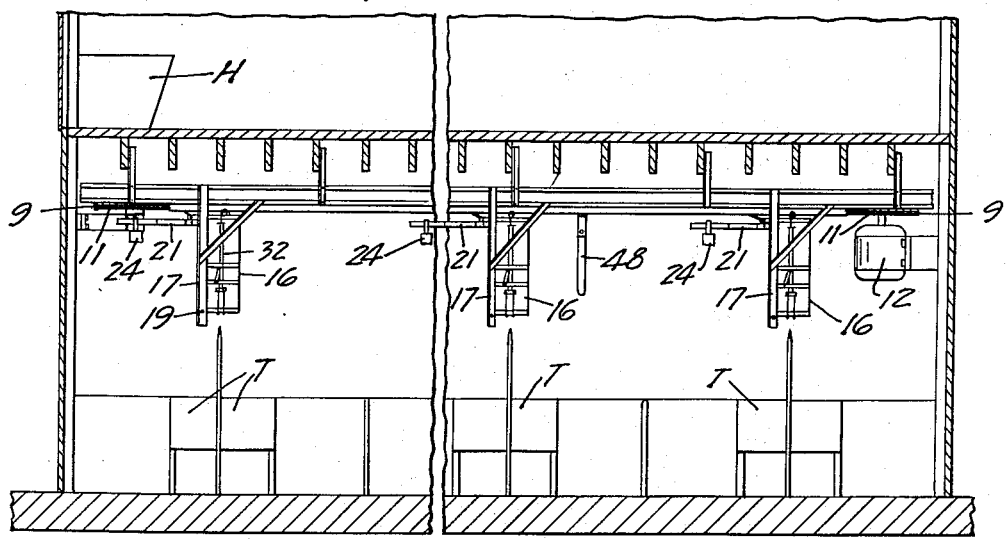
INVENTORS
GEORGE B. CARLSON
ARTHUR O. CARLSON
BY Williamson + Williamson
ATTORNEYS

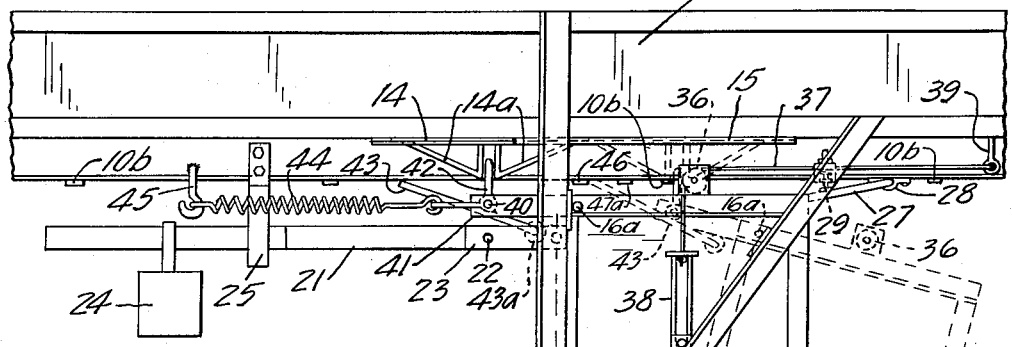
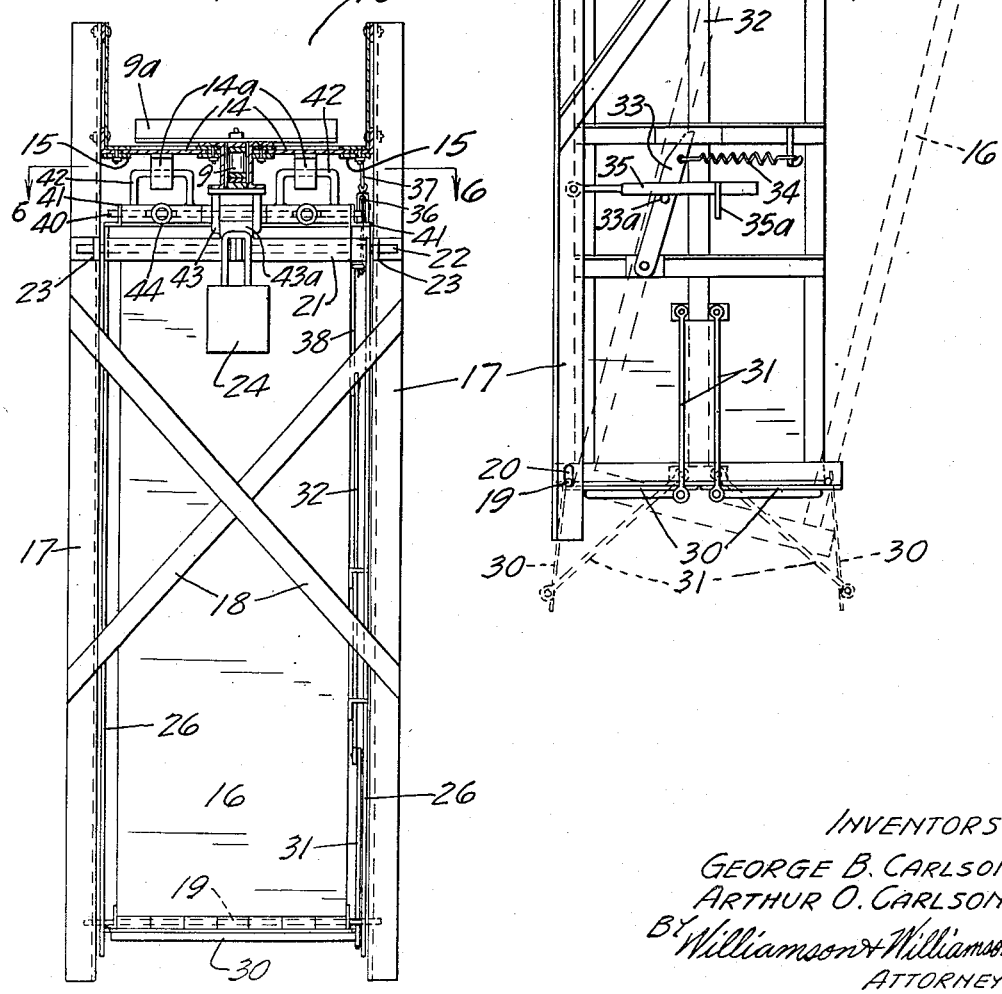

Jan. 25, 1955
G. B. CARLSON ET AL
2,700,479
AUTOMATIC MECHANISM FOR CONVEYING, WEIGHING AND DISCHARGING MATERIAL TO A PLURALITY OF SEPARATE LOCATIONS
Filed July 9, 1951
3 Sheets-Sheet 3
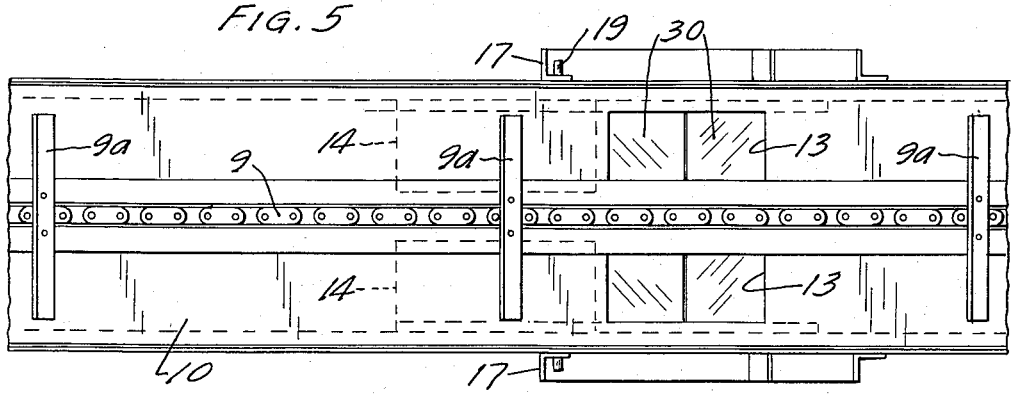
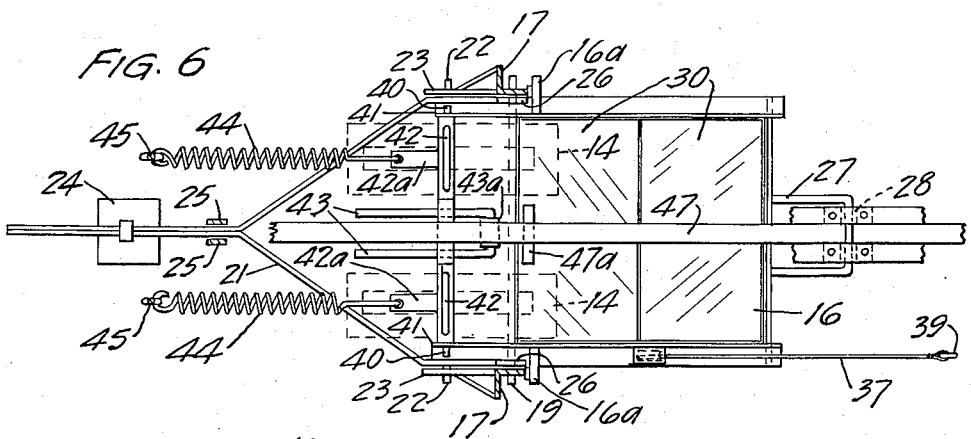
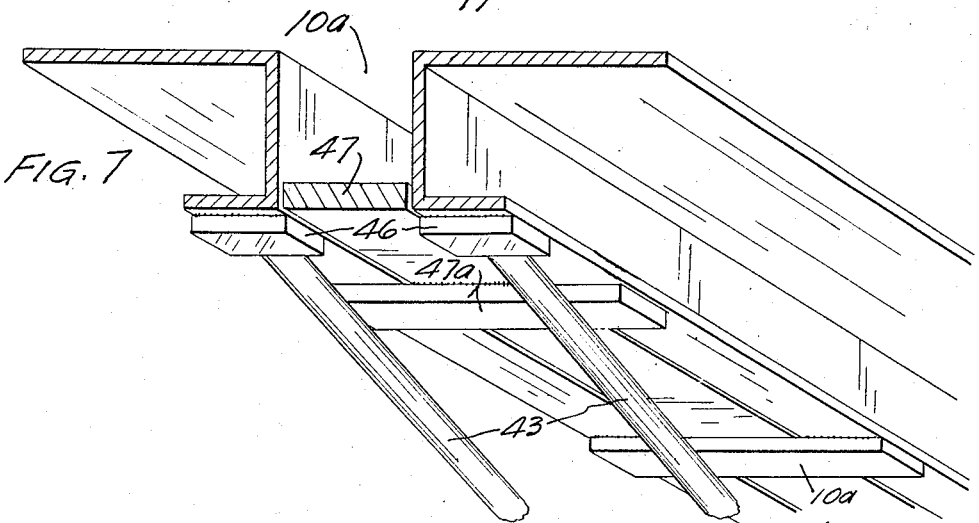
INVENTORS
GEORGE B. CARLSON
ARTHUR O. CARLSON
BY Williamson & Williamson
ATTORNEYS

United States Patent Office 2,700,479
Patented Jan. 25, 1955

2,700,479

AUTOMATIC MECHANISM FOR CONVEYING, WEIGHING, AND DISCHARGING MATERIAL TO A PLURALITY OF SEPARATE LOCATIONS

George B. Carlson and Arthur O. Carlson, Minneapolis, Minn.

Application July 9, 1951, Serial No. 235,814

4 Claims. (Cl. 214—2)

This invention relates to material distributing and weighing apparatus and particularly to apparatus for successively conveying feed material from a supply location to a plurality of discharge feeding locations and for successively discharging a predetermined weight of feed at each location.

It has long been a problem to distribute feed such as silage and the like to the various feed troughs provided in the live stock stalls within a barn. This has in the past necessarily been a hand operation and has always been a tedious part of the farm chores.

It is a general object of our invention to provide a highly ingenious material conveying mechanism to successively carry material to a plurality of discharge locations and to successively discharge a predetermined weight of material at said locations.

It is another object of our invention to provide a highly ingenious feed distributing mechanism particularly adapted for use in barns by means of which a predetermined amount of feed by weight is discharged into the respective feed troughs for the live stock stalls in the barn.

It is still another object to provide an endless conveyor mechanism adapted to carry feed such as silage and the like successively from one feed trough to the next and to discharge a predetermined weight of feed material successively into the respective troughs for consumption by the live stock in the stalls.

It is a further object to provide a weighing device working in close cooperation with a material conveyor and adapted to receive a predetermined weight of material from said conveyor and thereafter simultaneously discharge said material into a feed trough while stopping the flow of material from said conveyor mechanism.

More specifically, it is an object to provide a conveyor mechanism for carrying feed material from a supply location successively to a plurality of discharge locations within a barn and having a plurality of normally open discharge outlets selectively disposed in upwardly spaced relation above the respective feed troughs within the barn and having a weighing bin disposed below each outlet to receive feed material from the conveyor through the respective outlets and, when a predetermined weight of material has been received in a particular bin, to close said outlet into that bin and simultaneously dump the material in the bin into the feed trough disposed therebelow.

These and other objects and advantages of our invention will more fully appear from the following description made in connection with the accompanying drawings wherein like reference characters refer to similar parts throughout the several views and in which:

Fig. 1 is a top plan view of our material distributing and weighing apparatus as mounted in operative position within a barn;

Fig. 2 is a central longitudinal vertical sectional view showing one side of our distributing mechanism in side elevation;

Fig. 3 is a side elevational view showing a portion of the conveyor and one of the weighing bins showing the same in retracted, material receiving position by full lines and in dumping position by dotted lines;

Fig. 4 is a transverse vertical sectional view thereof as viewed from the left of Fig. 3 showing the conveyor in vertical section and the weighing bin in rear elevation;

Fig. 5 is an enlarged top plan view of a portion of the conveyor mechanism and showing the outlet openings into one of the weighing bins in open relation;

Fig. 6 is a horizontal sectional view taken substantially along the line 6—6 of Fig. 4; and Fig. 7 is an enlarged fragmentary perspective view showing the bin return trip mechanism in detail.

As best shown in Figs. 1 and 2, our invention is particularly adapted to be mounted in a barn to deliver predetermined quantities of feed to the live stock stalls therein. An overhead conveyor channel 10 with a central longitudinal recess forming a chain track 10a extending the full length thereof is adapted to be mounted within a barn and extend over the front portions of the respective stalls. These stalls, as illustrated, are arranged in pairs respectively designated by the letters A through F as shown in Fig. 1. A single feeding trough designated by the letter T is provided for each pair of stalls as best shown in Fig. 2. Any suitable means for supplying feed material such as silage to the conveyor channel 10 may be provided such as the hopper H, best shown in Figs. 1 and 2. An endless chain 9 extends around said channel 10 and travels within the longitudinal chain track 10a and suitable sprocket wheels 11 are provided at the respective corners of channel 10 with the chain intermeshed therearound. Means for driving one of these sprockets 11, such as the electric motor 12, is provided, as best shown in Fig. 2.

Suitable discharge openings 13 are provided above the respective troughs T and are formed in the bottom of the channel 10 on each side of the central track 10a. A closure is provided for the openings 13 and in the form shown constitutes a horizontal slide 14 for each opening 13. These slides are arranged in cooperatively associated pairs for simultaneous actuation thereof and suitable guides 15, best shown in Fig. 4, provide sliding tracks for the respective slides 14.

A weighing bin or box 16 having an open top is disposed under each pair of discharge openings 13 to receive feed material delivered through said openings, the slides 14 being normally disposed in open position. A depending supporting structure having a pair of upright members 17 is rigidly connected in downwardly extending relation to the side members of the conveyor channel 10, as best shown in Fig. 4. These uprights 17 are rigidly interconnected by the diagonals 18. The bin 16 is pivotally mounted at the lower portions of said uprights 17 on the pivot pins 19 which extend through elongated slots 20 in said uprights 17 to permit operation of the weighing mechanism, to be subsequently described herein. A weighing beam 21 is fulcrumed on a pivot rod 22 which is suitably supported from the upper portion of the two uprights 17 as by the fixed brackets 23. An adjustable weight 24 is spaced forwardly from pivot pin 22 and suitable guides 25 are provided on each side of the beam 21, as best shown in Figs. 3 and 6. As illustrated in Fig. 6, the beam 21 is generally Y-shaped and the two divergent arms of the Y have a pair of interconnection elements or links such as the upright weighing straps 26 respectively pivotally mounted at the rear ends of said arms in closely spaced relation to the weighing pivot 22. The box pivot pins 19 are pivotally connected with the respective lower ends of the weighing straps 26 in close fitting relation therewith, lost motion being provided only between the pins 19 and the rigid upright supports 17 by the elongated slots 20. A stop 27 is connected to the lower portion of the conveyor channel 10 and normally engages the upper front portion, at the upper edge of the box opposite the pivot pins 19. The stop 27 is pivotally mounted as by the brackets 28 and is resiliently urged into downward position as by the spring pressed pin 29, as best shown in Fig. 3.

A pair of pivoted dumping doors 30 shown in open position by dotted lines in Fig. 3 are in the form shown hinged along their front and rear edges and normally close the bottom of the box 16 which of course has closed side panels on all four sides thereof. The opposed free edges of said doors 30 swing downwardly into open position and have the lower ends of links 31 respectively pivoted thereto at the right side of bin 16. The upper ends of said links 31 are pivoted to an upright latch bar 32 which normally holds the doors in closed position. A spring latch dog 33 normally engages a notch in bar 32 and is urged toward said bar by a spring 34. The trip rod 35 normally rides on a trip pin 33a and has a pin engaging release element 35a disposed in depending relation from said rod 35 and normally spaced forwardly from pin 33a but engaging said pin to remove the latch dog 33 from the notch in latch bar 32 when the box 16 swings into dumping position, thus permitting the weight of the feed material within the box 16 to swing the doors 30 downwardly into open position as shown by the dotted lines of Fig. 3 to discharge the material contained in the box 16. A guiding sheave 36 is journalled for rotation on the upper portion of box 16 and has a flexible element such as the rope 37 trained therearound. One end of the rope 37 is connected to the top bar 32 and a lost motion connection 38 is provided between the bar and the rope. The other end of the rope is secured to any suitable fixed anchor as at 39.

A transversely disposed shaft 40 is mounted in suitable rearwardly extending brackets 41 which are respectively fixed at the upper right and left sides of box 16. A pair of upwardly extending slide actuating elements 42 are journalled in spaced relation on shaft 40 and a retaining latch 43 is also journalled on said shaft 40 and is interposed between said two actuating elements 42. The forward end of retaining latch bar 43 has weights 43a fixed thereto to normally hold the rear end of said latch in upwardly swung position, as shown in Fig. 3. A pair of rearwardly extending arms 42a are fixed to said actuating elements 42 and box return springs 44 are respectively connected therewith and resiliently hold said upwardly extending slide actuating elements 42 in upstanding relation. The rear ends of springs 44 are respectively anchored as by the fixed hooks 45. Each of the slides 14 has a pair of spaced brackets 14a for receiving the upper portions of the respective actuating elements 42, as best shown in Fig. 3. The stops 16a engage rigid frame members to limit the swinging movement of the bin 16.

*Operation*

The feed material such as silage is delivered to the conveyor channel 10 and is carried therein by suitable slats 9a fixed in spaced relation along the chain 9. The material is carried to the successive discharge openings 13 and falls down into the open topped bin or box 16 disposed therebelow, the closure slides 14 being normally disposed in open position. When a predetermined weight of material has been deposited in the bin 16 through openings 13, the weighing beam 21 will swing on its axis 22 and lower the rear weighing bars 26 and box pivot pins 19 will be shifted downwardly in their respective slots 20. With the lowering of the bars 26, the box 16 will be similarly lowered since it is carried thereby so that the upper front edge thereof will shift downwardly below the abutment end of retaining stop 27 to permit the eccentrically disposed weight of material contained in the box to swing said box forwardly into the dotted position shown in Fig. 3. When the release element 35a engages trip pin 33a, the door latch bar 32 will be released to permit the doors 30 to swing open and discharge the material contained in box 16 into the respective feed troughs T of adjacent bins. When the box or bin 16 swings into dumping position, the slide actuating elements 42 will shift the closure slides 14 into closed position and thereby close the respective openings 13 disposed thereabove. The feed trough T of live stock stalls A will be filled first and the troughs of stalls B through F will be subsequently filled in succession as the material is carried thereto by the conveyor slats 9a in channel 10. The dump boxes or bins 16 will remain in dumping position until after all of the troughs T have been filled. To hold the boxes 16 in dumping position against the force of return springs 44, the retaining latch 43 is engaged against a fixed stop element 46, best shown in Fig. 7. A pair of elongated slidable release bars 47 are respectively mounted on the sides of the barn and form the bottoms for the side portions of the elongated recess 10a, and the supporting straps 10b support the bars 47. One bar 47 extends along the conveyor channel over the troughs of stalls A, B and C and the other over the troughs of stalls D, E and F. A suitable actuating lever 48 is provided for shifting each of the bars 47, as best shown in Fig. 2, and each of the bars 47 has a camming release element 47a fixed thereto for each of the bins 16, as best shown in Figs. 6 and 7. When the respective bars 47 are shifted rearwardly, the respective camming elements 47a will engage the pivoted retaining latches 43 and cam the same downwardly away from the respective fixed stop elements 46. As soon as the latches 43 ride off of their respective stops 46, the return springs 44 will swing the box 16 back into normal material-receiving position and the slides 14 will be carried rearwardly by the actuating elements 42 to open the discharge openings 13. The rope 37 will return the latch bar 32 into upwardly retracted position to permit the spring latch dog 33 to be received in the notch thereof and to swing the doors 30 into closed position to be securely held therein by said dog 33 until the box is again filled. The spring pressed stop 27 will swing downwardly into box-engaging position since the weighing beam 21 will shift the box upwardly to raise the pivot pins 19 in their respective slots 20, and raise the front upper edge into stop-engaging position.

It will be seen that we have provided an extremely ingenious, highly efficient apparatus for conveying material successively to a plurality of discharge locations such as the feeding troughs T disposed in spaced relation therebelow and to provide means for weighing the material discharged at each location whereby only a predetermined weight of material will be delivered to each location. The openings 13 permit the material being carried by the conveyor slats 9a to drop into the open topped weighing bins or boxes 16 as the material passes thereover. When a predetermined weight of material has been received in each of the bins 16, the weighing beam 21 will shift the entire bin downwardly and permit the same to swing into dumping position to actuate the dumping mechanism and simultaneously close the openings 13 by shifting the slides 14 into closure position. When all of the bins 16 have been dumped, the bins on each side may be simultaneously returned to normal position by shifting the respective camming rods 47 to release the stops 43. It should be noted that the weight of material discharged by the respective bins may be individually varied and is controllable by shifting the respective weights 24 along the beams 21. Our apparatus permits a farmer to load the hopper H, which can be made of sufficient size to fill all the troughs with the desired amount of material, and merely start the conveyor. A predetermined weight of material will thereafter be discharged into each of the feeding troughs T. Obviously, a conventional loader mechanism of any approved design may be used to fill the hopper and thereby eliminate any hand operation for the feeding of the live stock.

It will, of course, be understood that various changes may be made in the form, details, arrangement and proportions of the parts without departing from the scope of our invention.

What we claim is:

1. Apparatus for successively conveying feed material to a plurality of feed troughs for the respective livestock stalls within a barn and for automatically discharging a predetermined weight of material into each of said feed troughs, said apparatus comprising an overhead conveyor mechanism for receiving feed material from a supply source and conveying the same successively above the respective troughs, said conveyor mechanism having a plurality of openings respectively disposed above the troughs, a plurality of open topped weighing bins respectively disposed above said troughs and normally positioned to receive the material discharged through said openings, the lower portions of said bins being respectively pivoted to permit swinging movement thereof, stop means for normally holding said bins against swinging movement, a weighing mechanism responsive for actuation to the weight of material discharged into a particular bin for releasing said bin stop when a predetermined weight of material has been received therein and permit said bin to be swung on said pivot, a normally closed, bin-dumping mechanism disposed at the bottom of each bin and responsive for opening to the swinging movement of said bin to dump a predetermined weight of material when said bin swings into dumping position, closure means responsive to the swinging movement of said bin for closing the openings disposed thereabove, and releasable stop means retaining said closure means in closed position until released.

2. The structure set forth in claim 1 and resilient means for urging the bin toward normal position and a releasable stop means for holding the bin in dumping position until all of the bins have been dumped and stop releasing means for simultaneously returning certain of said bins to normal position for again receiving material from the conveyor.

3. The structure set forth in claim 2 and said closure stop means for said conveyor openings being released to return said closure means to normal position when said bins are swung back into material-receiving position.

4. Apparatus for conveying material successively to a plurality of feeding troughs for livestock stalls within a barn and for automatically discharging a predetermined weight of material into each trough, said apparatus comprising an overhead, endless conveyor mechanism adapted to be mounted above the respective troughs, said conveyor mechanism having a plurality of discharge openings respectively disposed above the troughs, an open topped weighing bin mounted below the openings above each trough to receive material discharged through said openings and confine the same until a predetermined weight has been received therein, a weighing mechanism pivotally supporting the lower portion of each bin, said weighing mechanism constituting a pivoted weighing beam to permit downward shifting movement of said bin when a predetermined weight of material has been received therein, a stop member holding said bin in material-receiving position when said bin is in raised position but releasing said bin when the weight of material therein has lowered said bin to permit said bin to swing on its pivotal support, a releasable bottom closure normally closing the bottom of said bin but responsive to the swinging movement thereof to open said bin bottom and discharge the material therein, a closure mechanism connected with the upper portion of said bin and responsive to the swinging movement thereof for closing the openings in said conveyor disposed above said bin when said bin is swung into dumping position, stop means for holding said bin in dumping position after the same has been dumped and manually operated means for returning a plurality of interassociated bins to normal position by simultaneously releasing the stop means therefor after the same have been dumped.

References Cited in the file of this patent

UNITED STATES PATENTS

| | | |
|---|---|---|
| 871,630 | Richardson | Nov. 19, 1907 |
| 1,337,842 | Lambertz | Apr. 20, 1920 |
| 2,003,832 | Jeffrey | June 4, 1935 |
| 2,115,620 | Cave | Apr. 26, 1938 |
| 2,232,404 | Pratt | Feb. 18, 1941 |
| 2,280,614 | Ayars | Apr. 21, 1942 |
| 2,317,865 | Talbot | Apr. 27, 1943 |
| 2,412,506 | Greene | Dec. 10, 1946 |
| 2,521,998 | Rottier | Sept. 12, 1950 |
| 2,627,336 | Cordis | Feb. 3, 1953 |

OTHER REFERENCES

Page 395 of "Industrial Weighing," by Douglas M. Considine, published 1948 by Reinhold Publishing Corp., New York, N. Y.